United States Patent [19]
Bisewski

[11] 3,841,169
[45] Oct. 15, 1974

[54] FLAT LINK CHAIN
[75] Inventor: Alfons Bisewski, Hagen, Germany
[73] Assignee: Ruberg & Renner GmbH, Hagen, Germany
[22] Filed: Jan. 10, 1973
[21] Appl. No.: 322,561

[52] U.S. Cl.............................................. 74/250 R
[51] Int. Cl............................................ F16g 13/02
[58] Field of Search................................... 74/250 R

[56] References Cited
UNITED STATES PATENTS

| | | | |
|---|---|---|---|
| 2,219,125 | 10/1940 | Bremer | 74/250 R |
| 2,602,345 | 7/1952 | Braumiller | 74/250 R |
| 2,905,264 | 9/1959 | Dennis | 74/250 R X |
| 3,153,940 | 10/1964 | Patrignani | 74/250 R |
| 3,234,698 | 2/1966 | Kimblern | 74/250 R X |
| 3,604,755 | 9/1971 | Krekeler | 74/250 R X |
| 3,678,774 | 7/1972 | Patrignani | 74/250 R |

Primary Examiner—Leonard H. Gerin
Attorney, Agent, or Firm—Walter Becker

[57] ABSTRACT

A link chain with inner and outer chain links or inner and outer chain link sections, in which adjacent inner or outer chain links or inner and outer chain link sections are provided with extensions forming abutments through which the pulling force acting on the chain is transmitted when the chain sections comprising the respective abutments moves along a straight path, thereby relieving the chain elements which are intended to be engaged by the sprocket wheels when passing thereover, from being subjected to the pulling forces acting upon the chain.

13 Claims, 10 Drawing Figures

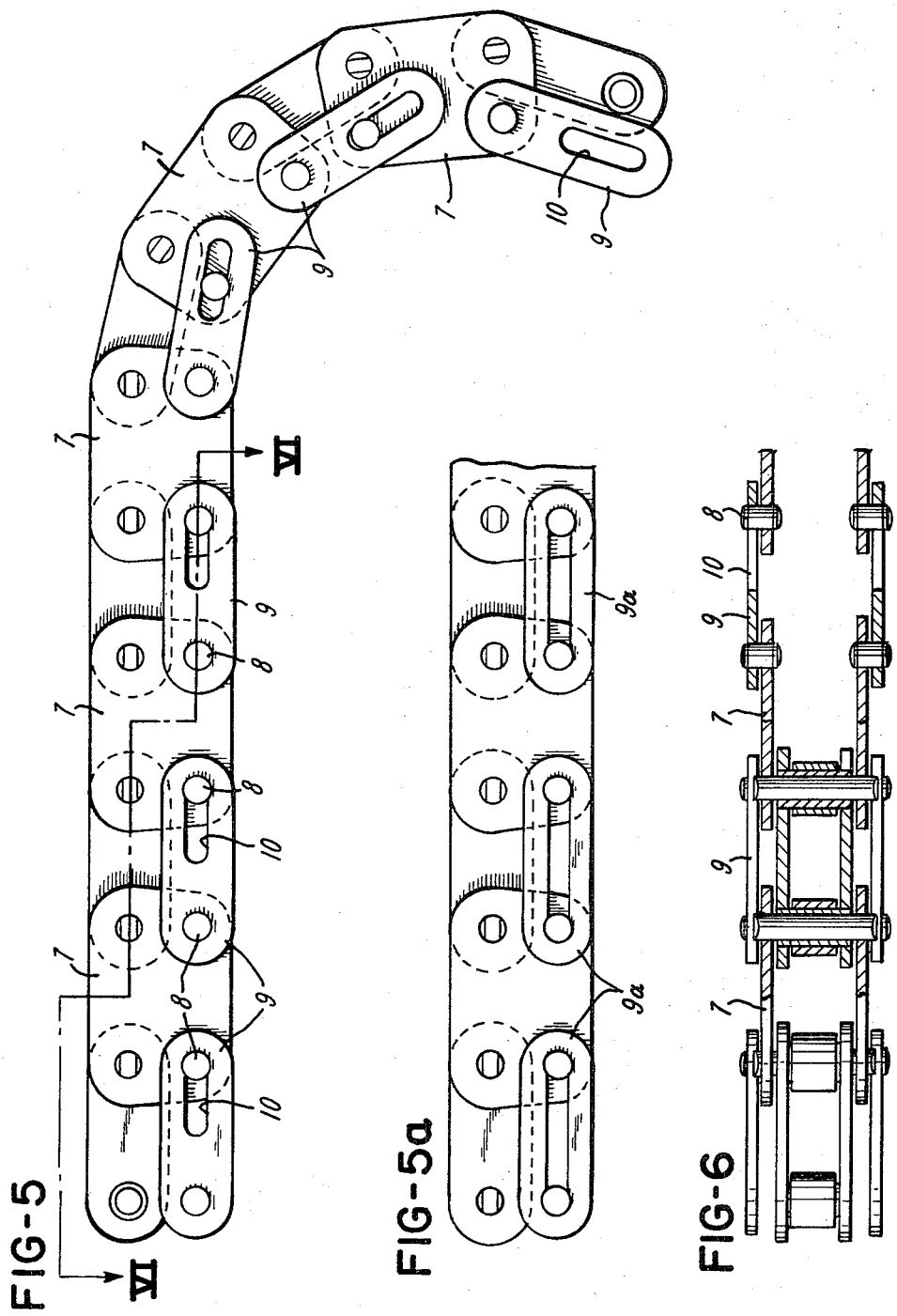

FLAT LINK CHAIN

The present invention relates to a flat link chain with links movable in one direction only, which includes connecting elements which become effective on the links when the chain assumes its stretched position and which in such an instance bring about a pull-resistant connection of the chain links.

Flat link chains such as steel bushed or roller chains which are employed for power transfer, wear in the course of operation more or less at the joints whereby an undesired elongation of the chain occurs. In some instances, it is possible to counteract the chain extension caused by wear, i.e., the increase in the pitch or distance between adjacent chain links, by chain tighteners or by increasing the axial distance or spacings between the sprocket wheels.

With many link chain drives, for instance, when transporting workpieces from one working station to the next working station, it is necessary that the length of the chain possibly remains constant because otherwise a discrepancy occurs with regard to the fixed distance between the stationary working stations. In order, in such instances, to be able to correct the extensions of the chain, it is necessary to provide the chain with complicated adjusting devices.

In order to reduce the wear of link chains as far as possible, it has in many instances been suggested to greatly over dimension the chains whereby the specific wear is reduced and the life span of a chain can be extended within certain limits. Chains of this type, however, are expensive and, moreover, have larger dimensions which have a disadvantageous effect upon the design of auxiliary devices used in connection with chain drives.

It has also been suggested to equip link chains with needle bearings in order to prevent or reduce the wear of the chain. These designs, however, have not been adopted to any material extent in practice because the chains not only have larger dimensions but are rather expensive.

It is, therefore, an object of the present invention to provide a flat link chain with links movable in one direction only, especially a steel bushed or roller chain in such a way that the extension of the chain normally resulting from a wear at the chain joints cannot affect the chain in the stretched position thereof.

These and other objects and advantages of the invention will appear more clearly from the following specification, in connection with the accompanying drawings, in which:

FIG. 5 is a side view of a second embodiment of a flat link chain according to the invention with additional auxiliary links.

FIG. 5a differs from FIG. 5 in that the slot in the link comprises both of the pertaining bolts.

FIG. 6 is a section through a portion of a flat link chain according to the invention, said section being taken along the line VI—VI of FIG. 5.

Figure 7:
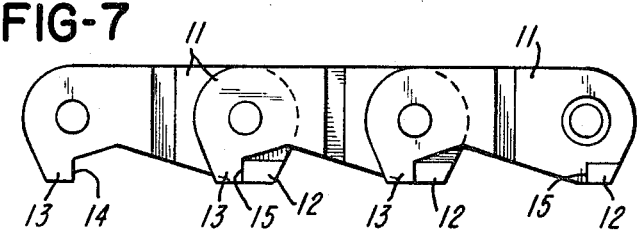

FIG. 7 represents a side view of a flat link chain according to the invention with cranked links.

Figure 8:
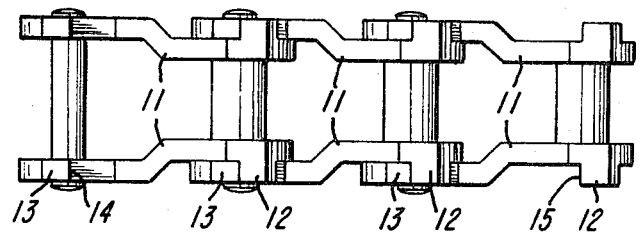

FIG. 8 shows a view of that side of the flat link chain according to the invention of FIG. 7, on which hook-shaped extensions are provided.

Figure 9:
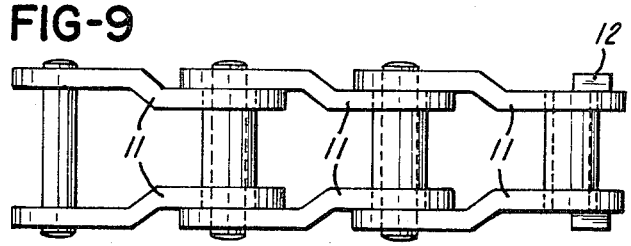

FIG. 9 is a top view of the chain according to FIG. 7.

The problem underlying the present invention has been solved by providing connecting elements which engage each other only in the stretched position of the chain and which are so designed that during the pivoting movement of the chain links they will not be under the effect of forces and consequently will neither directly nor indirectly be subjected to wear.

A first embodiment of the flat link chain according to the present invention is characterized primarily in that with regard to the circulation of the chain around a sprocket wheel, the inner edge of the inner and outer link elements is provided with recesses which face each other and have a length corresponding to the pitch of the chain while at the ends of said recesses, there are provided extensions respectively engaging the recess of the oppositely located link elements, said extensions embrace each other in pairs from one link element to the next link element and are in pressure contact with each other when the chain occupies its stretched position.

The engaging surfaces of said extension for the mutual pressure contact are according to a further development of the invention extending approximately perpendicularly with regard to the pulling direction of the stretched-out chain. Furthermore, it is provided according to the invention that the depth of the recesses is somewhat greater than the height of a part of an extension, which part protrudes beyond the wall of a chain element.

According to a further development of the invention, the recesses are open toward the inner edge of the chain elements and at their opposite side are provided with a bulged-out wall portion. Furthermore, the inner and outer chain elements are identical with regard to the design of the recesses and of said extensions.

According to a second embodiment of the invention, the outer chain elements are relative to the inner chain elements widened on the inner side with regard to the circulation of the chain about a sprocket wheel and on each outer spring element at the widened portion there are provided two pivots which protrude outwardly from the plane of the link elements while the distance between said pivots corresponds to the pitch of the chain. An auxiliary flat spring element is mounted on the pivot of two successive outer flat spring elements. This auxiliary flat spring element is so designed that at least one pivot is freely movable from the positive end position in the stretching position of the chain to the center of the auxiliary flat spring element.

According to a further feature of the invention, each auxiliary flat link element has a bore and an oblong hole for receiving the two pivots of two successive outer flat link elements. The auxiliary flat link elements may, however, if desired, be provided with a slot for guiding the pivots.

A third embodiment of the invention relates to a flat link chain with cranked links or chain elements and is, according to the invention, so designed that with regard to the circulation of the chain about a sprocket wheel, the inner side of the chain at the inner section of each cranked flat link element is provided with an extension which laterally protrudes from the plane of this section and is provided with an engaging surface in conformity with the chain pitch. At the outer section of each chain link there is provided a hooked extension having an engaging surface and directed toward the inside of the chain. This hooked extension will, in the stretched-out position of the chain with this engaging surface, engage the engaging surface of the extension of the next following flat chain element. The engaging surface for the mutual pressure contact of said extensions extends according to a further development of the invention approximately perpendicularly with regard to the pulling direction of the stretched chain. The height of the extension extending toward the side corresponds approximately to the thickness of the flat chain element.

According to a further development of the invention, the narrow side of the outer section of the flat chain element adjoining the hooked extension is inclined in such a way that together with the engaging surface of the hook-shaped extension it will form an acute angle.

Referring now to the drawings in detail, in which as far as FIGS. 1 to 4 are concerned, a roller chain has been shown by way of example. The inner and outer flat chain elements 1, 2 areas will be evident from the side view of FIG. 1, designed somewhat wider toward the inner side with regard to the central plane through the chain bolts. On the inside, the flat chain links are provided with recesses 3 at the ends of which there are extensions 4 which with regard to the wall of the flat links protrude by a distance $a$ which is less than the depth $b$ of the recesses 3. The surfaces 5 of the extensions 4, by means of which the adjacent extensions contact each other when the chain moves along a straight path, extend approximately perpendicularly with regard to the pulling direction of the stretched chain. As will be evident from the side view of FIG. 1, the recesses 3 extend on one hand to the inner edge of the links 1, 2 and on the other hand are closed off by an inwardly arched wall 6. In this connection, it may be mentioned that the inner flat chain elements 1 and 2 of the link chain are substantially identical.

Figure 1:
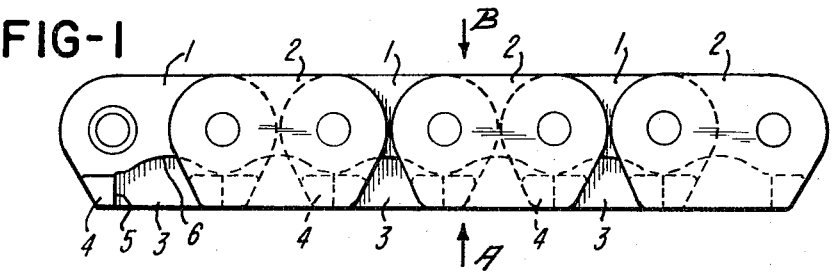
FIG. 1 illustrates a side view of a first embodiment of a flat link chain according to the invention.
Figure 2:
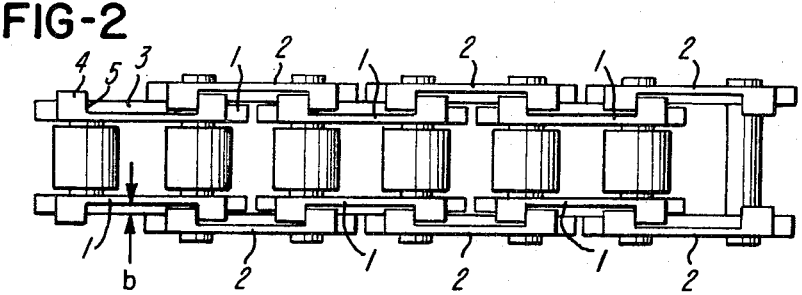
FIG. 2 is a view of the inner side of the flat link chain according to the invention with regard to its circulation about a sprocket wheel, said view being seen in the direction of arrow A of FIG. 1.
Figure 3:
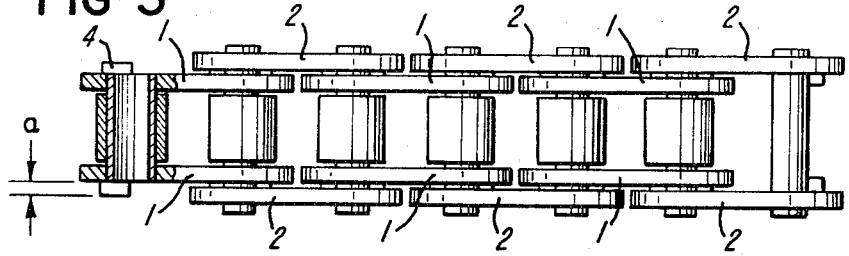
FIG. 3 is a view of the outside of the flat link chain according to the invention while a link consisting of inner flat plates is partially sectioned, said view being seen in the direction of the arrow B of FIG. 1.
Figure 4:
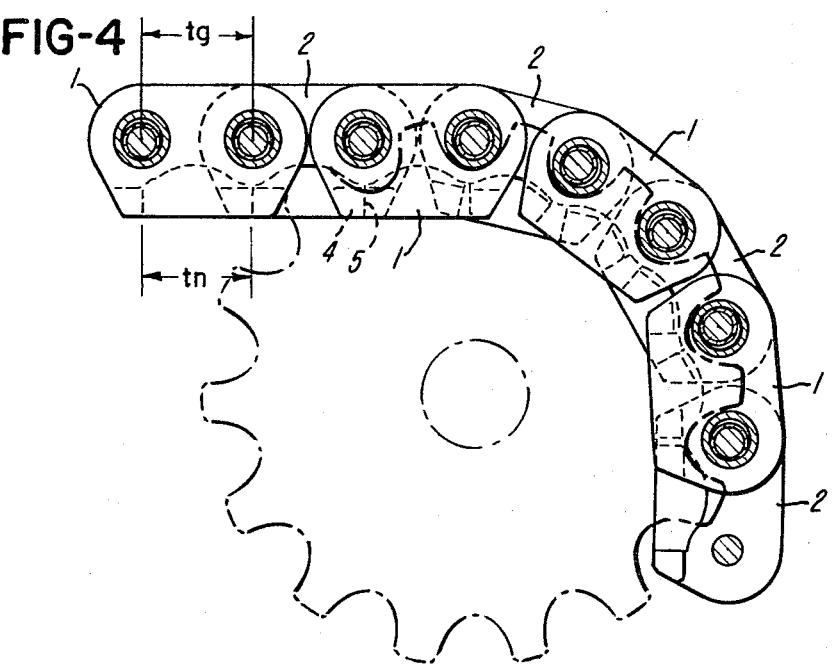
FIG. 4 shows a longitudinal section through a flat link chain according to the invention in wound-off condition while the sprocket wheel has not been illustrated in order not unnecessarily to clog up the drawing.

In FIG. 4, the angled-off extension of the link chain shows how the extensions 4 are lifted off from each other in a sprocket wheel when the chain moves over a sprocket wheel. During the movement of the flat link chain on the sprocket wheel, the power transmission is effected through the intervention of the chain bolts as is the case with heretofore known flat link chains.

The pitch tn of the end faces of the extensions 4 of a flat link chain according to the invention corresponds to the pitch tg of the link members of the chain. Since with all chains a certain play has to be present between the chain bolts and the chain sleeves in order to assure on easy moveability of the chain, it will be appreciated that when the chain moves along a straight path, said play automatically adjusts itself symmetrically with regard to the center of the chain link. With increasing time of use of the flat link chain, this play increases without, however, influencing the chain pitch in the straight chain section.

With the embodiment of the invention illustrated in FIGS. 5 and 6 only the outer flat link elements 7 are widened inwardly. These outer link members are provided with protruding pins 8 which serve for journaling additional auxiliary flat links 9. In the auxiliary links 9 there is provided a bore as well as an oblong hole 10 so that the pins 8 engaging a connecting link will be able during the bending of the flat link chain on a sprocket wheel to move one over the other.

The auxiliary links 9 are at their positive engagement with the pin 8 dimensioned in such a manner that in the stretched-out or straight condition of the chain the pulling force is transferred only through the auxiliary links 9 and not via the chain bolts. During the movement of the chain on the sprocket wheel, the auxiliary links 9 are relieved and therefore are not worn.

With the embodiments illustrated in FIGS. 7, 8 and 9, the flat links of the chain are formed by cranked flat links 11. In this instance, the inwardly located section of each link 11 has a projection 12 projecting from the plane of said section. The other outwardly located section of link 11 is designed as a downwardly extending hook 13. In the stretched or straight condition of the chain, the hook-shaped extension 13 has its inwardly located surface 14 engage the likewise inwardly directed surface 15 of an extension 12.

The operation of the flat link chain composed of said cranked flat links 11 is substantially the same as described in connection with the previously set forth embodiments of the invention. Also, with the last mentioned flat link chain, the hook-shaped extensions 13 and the extensions 12 are relieved during the movement of the chain over a sprocket wheel and consequently are not subjected to wear.

As will be evident from the above, the present invention yields a flat link chain in which in a simple manner there is provided an additional pull connection from link to link, which pull connection is effective only during the straight course of the chain and thus is not affected by wear which is normally caused by flexure or articulation of the chain. Although with a flat link chain according to the invention wear will occur at the joints, it will be appreciated that during the straight path movement of the chain the original chain pitch is maintained, inasmuch as the power transmission is effected not through the joint portions, but only by means of the additional connecting means through the links of the chain.

It will also be appreciated that a flat link chain according to the invention is particularly suitable for cam shaft drives, inasmuch as in such an instance emphasis is placed upon the fact that the length of the chain must not be changed during the use of the chain. The fact that with a chain according to the invention an extension of the chain over the straight path of the latter has the additional advantage that in the loose section of the chain, especially when the latter is approximately horizontal, only a very slight sag occurs.

It is, of course, to be understood that the present invention is, by no means, limited to the specific showing in the drawings, but also comprises any modifications within the scope of the appended claims.

What we claim is:

1. A link chain comprising in combination outer chain link means and inner chain link means, and pivot means respectively extending transverse to and through said outer and inner chain link means and pivotally connecting said inner and outer chain link means to each other at pivot locations subject to wear occurring positively and encountered for pulling load, said inner and outer link means respectively including abutment means located upon inner side of the chain during bending in a predetermined range and operable in straight pulling condition of the pertaining chain link means to abut each other in pairs along planes transverse to the straight longitudinally extending chain portion comprising the respective abutment means having surfaces that move toward each other during bending, said abutment means when abutting each other being spaced from each other by a distance equalling the pitch of said chain thereby to avoid effect of change in chain length by way of wear especially under pulling load.

2. A link chain in combination according to claim 1, in which said link means include inner links and outer links with each inner link facing and overlapping two adjacent outer links and with each outer link facing and overlapping two adjacent inner links, while those sides of said links which face each other are provided with recesses extending in the longitudinal direction of said chain and equalling in length the pitch of said chain, said abutment means being located at the ends of said recesses and protruding beyond the latter and the non-recessed wall portion of the pertaining link.

3. A link chain in combination according to claim 1, in which said abutment means abut each other in pairs along planes s perpendicular to the straight longitudinally extending chain portion containing the respective abutment means abutting each other.

4. A link chain in combination according to claim 2, in which the depth of said recesses is in excess of the distance by which the respective abutment means protrude beyond the non-recessed wall portion of the respective chain link.

5. A link chain in combination according to claim 2, in which the recess of each link is open toward the inner edge of said link and has a contour bulging toward the central portion of the link.

6. A link chain in combination according to claim 2, in which the inner and outer links are substantially identical with regard to the recess and the abutment means.

7. A link chain in combination according to claim 1, in which said inner link means include inner chain links each being provided with two pins permanently spaced from each other by a distance equalling the pitch of said link chain, and in which said outer link means include outer chain links each having opening means therethrough engaged by one pin each of the respective adjacent two inner links, that wall portion of each outer link which defines the opening means thereof defining with one of the pins in said opening means one pair of said abutment means abutting each other in straight pulling condition of the pertaining link, said opening means being such as to permit the pins which engage the opening means in one and the same outer chain link to relatively approach each other when the pertaining chain section curves for movement over a sprocket wheel.

8. A link chain in combination according to claim 7, in which said opening means in each of said outer links includes a bore and a longitudinal slot for respectively receiving one pin of the respective two adjacent inner links.

9. A link chain in combination according to claim 7, in which the opening means of each of said outer links is formed by a single longitudinal slot equalling in length the distance between the two adjacent pins respectively pertaining to the two adjacent inner links at each end portion of the respective outer link plus half the diameter of the last mentioned two pins.

10. A link chain in combination according to claim 1, which includes substantially identical cranked chain links with the adjacent cranked ends each two successive cranked chain links comprising portions overlapping each other and being provided with said abutment means.

11. A link chain in combination according to claim 10, in which the abutment means of the respective inner overlapping cranked link end is formed by an outwardly extending extension having a length substantially equalling the thickness of the respective outer overlapping cranked link end.

12. A link chain in combination according to claim 10, in which one end of each chain link forms an outer cranked link end whereas the other end of each chain link forms an inner cranked link end.

13. A link chain in combination according to claim 11, in which each chain link decreased in height from its outwardly extending extension toward its central portion.

* * * * *